United States Patent
Danner

(10) Patent No.: US 11,996,532 B2
(45) Date of Patent: May 28, 2024

(54) APPARATUS, SYSTEM AND METHOD FOR A SELF-HEATING BATTERY CIRCUIT

(71) Applicant: JABIL INC., St. Petersburg, FL (US)

(72) Inventor: Jeffrey David Danner, St. Petersburg, FL (US)

(73) Assignee: JABIL INC.

(*) Notice: Subject to any disclaimer, the term of this patent is extended or adjusted under 35 U.S.C. 154(b) by 613 days.

(21) Appl. No.: 17/282,184

(22) PCT Filed: Oct. 1, 2019

(86) PCT No.: PCT/US2019/053989
§ 371 (c)(1),
(2) Date: Apr. 1, 2021

(87) PCT Pub. No.: WO2020/072441
PCT Pub. Date: Apr. 9, 2020

(65) Prior Publication Data
US 2022/0013824 A1    Jan. 13, 2022

Related U.S. Application Data

(60) Provisional application No. 62/740,218, filed on Oct. 2, 2018.

(51) Int. Cl.
*H01M 10/637* (2014.01)
*H01M 10/615* (2014.01)
*H05B 1/02* (2006.01)

(52) U.S. Cl.
CPC ....... *H01M 10/637* (2015.04); *H01M 10/615* (2015.04); *H05B 1/0236* (2013.01)

(58) Field of Classification Search
CPC .. H01M 10/637; H01M 10/615; H05B 1/0236
(Continued)

(56) References Cited

U.S. PATENT DOCUMENTS 6,072,301 A * 6/2000 Ashtiani ............. H01M 10/637
                                                    320/128
8,941,358 B2   1/2015 Xu
(Continued)

FOREIGN PATENT DOCUMENTS

| EP | 2453514 | 5/2012 |
| JP | 2012016079 A | 1/2012 |
| KR | 1020140092978 A | 7/2014 |

OTHER PUBLICATIONS

International Search Report for PCT/US2019/053989, dated Jan. 20, 2020.
(Continued)

*Primary Examiner* — James M Erwin
(74) *Attorney, Agent, or Firm* — Riverside Law LLP

(57) ABSTRACT

The disclosed exemplary apparatuses, systems and methods may provide a self-heating battery circuit, that comprises: a high voltage battery having terminals, and a parasitic internal resistance (R1) and a parasitic terminal inductance (L1); a resonant circuit connected across the battery terminals suitable to generate high alternating currents about its resonant frequency, fr; an energy superposition unit connected across a capacitance of the resonant circuit, and including a switch (K1), wherein K1 is switched on and off at the resonant frequency, fr, and at a first duty cycle pursuant to a switch control signal, thereby generating a high alternating current through the high voltage battery.

11 Claims, 3 Drawing Sheets

(58) Field of Classification Search
USPC .......................................................... 429/120
See application file for complete search history.

(56) References Cited

U.S. PATENT DOCUMENTS

| | | | |
|---|---|---|---|
| 2005/0046387 A1* | 3/2005 | Aker | H02J 7/0048 |
| | | | 320/125 |
| 2012/0126753 A1 | 5/2012 | Carkner | |
| 2012/0280658 A1* | 11/2012 | Xu | H01M 10/615 |
| | | | 320/128 |
| 2013/0106361 A1 | 5/2013 | Wissmach | |
| 2013/0134146 A1 | 5/2013 | Han et al. | |

OTHER PUBLICATIONS

Written Opinion of the International Searching Authority for PCT/US2019/053989, dated Jan. 17, 2020.
International Preliminary Report on Patentability for PCT/US2019/053989, dated Jan. 17, 2020.
European Patent Office Communication issued in EP19868873, dated Mar. 6, 2024, 5 pages.

* cited by examiner

APPARATUS, SYSTEM AND METHOD FOR A SELF-HEATING BATTERY CIRCUIT

CROSS-REFERENCE TO RELATED APPLICATION

This application is a national stage application of International Patent Application No. PCT/US2019/053989, filed Oct. 1, 2019, entitled: APPARATUS, SYSTEM AND METHOD FOR A SELF-HEATING BATTERY CIRCUIT, which claims the benefit of priority to U.S. Provisional Application No. 62/740,218, filed Oct. 2, 2018, entitled: APPARATUS, SYSTEM AND METHOD FOR A SELF-HEATING BATTERY CIRCUIT the entireties of which are incorporated herein by reference as if set forth in its entireties.

BACKGROUND

Field of the Disclosure

The present disclosure relates to battery life and performance, and, more specifically, to an apparatus, system and method for providing a self-heating battery circuit.

Description of the Background

Batteries are often used to power many portable devices in the modern technological age. However, batteries, and hence the devices powered by those batteries, generally do not perform well or efficiently ate startup or when otherwise cold. There is thus a need to warm a battery to its respective operating temperature, but without deleterious effects on other aspects of device operation.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

Figure 1:
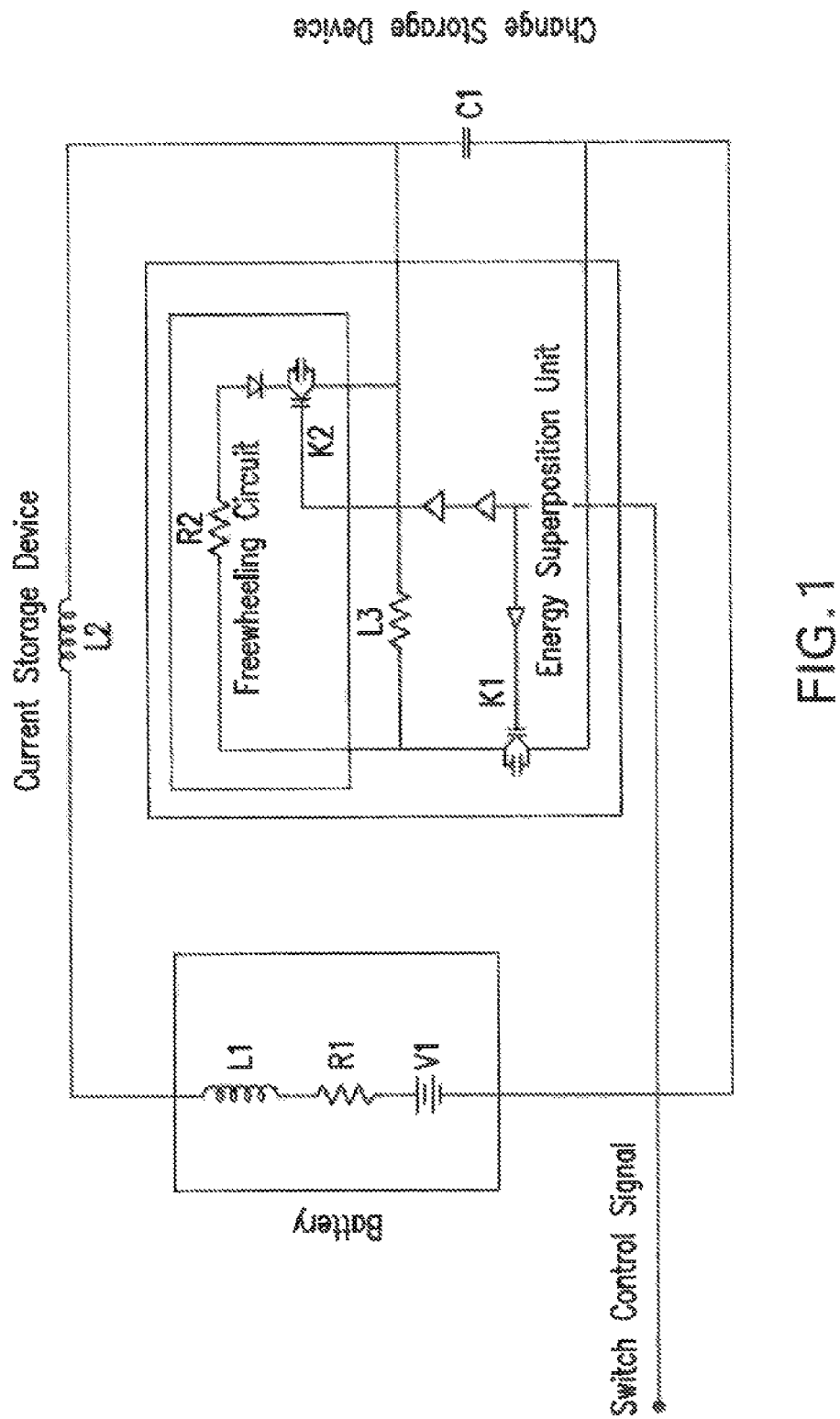
FIG. 1 is an illustration of embodiments of the disclosure.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

With respect to FIG. 1, V1, R1, and L1 provide a high voltage battery that includes a parasitic internal resistance (R1) and a parasitic terminal inductance (L1). The battery illustrated generally will not operate efficiently when it is cold, and thus it is efficient to optimize performance by pre-warming the battery to an optimal operating temperature.

It will be appreciated by the skilled artisan that current flowing within the battery will create a warming effect. This occurs because the battery current dissipates power across resistor R1 (V=IR), which effectively heats the battery from the within.

The resonant circuit of FIG. 1 is connected across the battery terminals, and generates high alternating currents. These currents are effectuated about a resonant frequency, fr, determined by $1/(2\pi*\text{sqrt}((L1+L2)*C1))$. Of note, if the parasitic inductance (L1) is large, then L2 may be eliminated from the circuit. Needless to say, this may save weight and board room, and may thereby lower costs.

An energy superposition unit may be connected across C1. This unit may include an inductor (L3) and a switch (K1). K1 is switched on and off at the resonant frequency, fr, and at a specific duty cycle via the Switch Control Signal. Switching K1 appropriately generates and then sustains a high alternating current through the Battery, L2, and C1 devices, which heats the battery.

The energy superposition unit may include a freewheeling circuit consisting of a dampening device (R2) and a switch (K2) in order to recirculate residual current flowing in L3 when K1 turns off. This current recirculation path may be useful during an initial soft start up of the oscillating energy flow. However, during steady state operation, there is no recirculation current.

A hard start may not require the freewheeling circuit. However, the freewheeling circuit still enhances safe operation in the event of premature turn off of K1 in such a case.

Accordingly, the embodiments provide sustained oscillation without a switching device in line with the high current path, contrary to the known art. Thereby, the embodiments limit the additional cost and unwanted power loss to the circuit that would occur if such a switch were present in the high current path.

The embodiments provide high efficiency operation and improved battery performance. Obviously, the foregoing is particularly advantageous, as wasted energy is particularly unappealing in a battery powered system.

The embodiments additionally provide low K1 conduction losses, low K1 switching losses, zero current turn on, and zero voltage turn off. Further, the embodiments avoid excessive dependence on the value of R1 for the magnitude of the alternating heating current. This is significant, since the magnitude of R1 changes with battery temperature.

It should be noted that the magnitude of the alternating current may be increased by slightly increasing the frequency of the Switch Control Signal. This creates a phase advance in the Energy Superposition timing, which excites the circuit oscillation. The foregoing may be particularly advantageous if higher battery currents and faster heating is desired.

Figure 2:
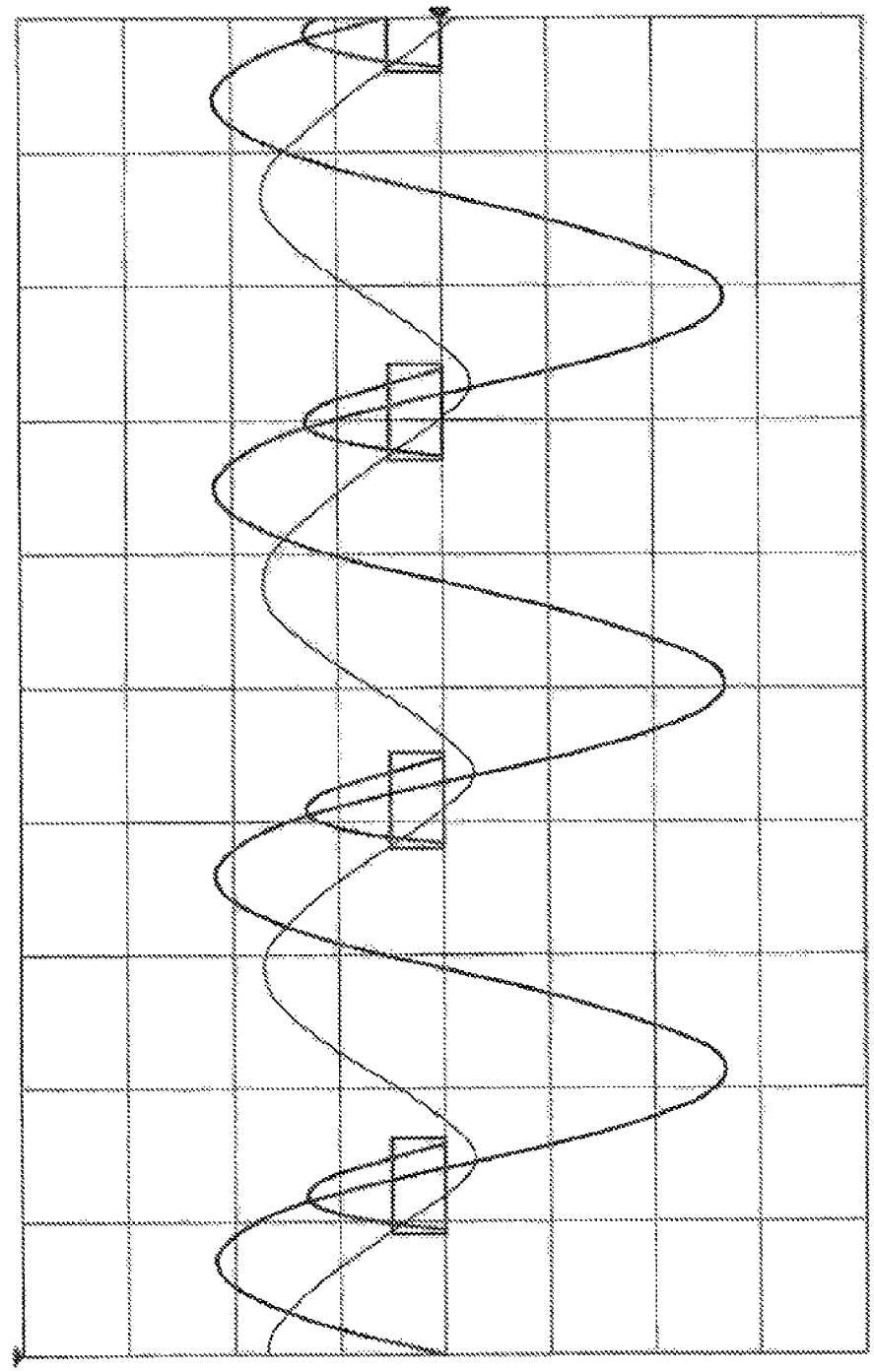
FIG. 2 is an illustration of embodiments of the disclosure.

FIG. 2 graphically represents an exemplary particular embodiment of the circuit of FIG. 1. In the illustration of FIG. 2: V1=400V; R1=125 mohms; L1=4 uH; L2=5 uH; C1=10 uF; and L3=3 uH. At a battery current (red line) of 344 Arms, the R1 dissipation=0.125*344*344=14.8 kW of heat; the K1 current (pink)=87 Arms; and the conduction losses=87 A*2V=174 W. In this example, the Switch Control Signal (blue)=17.1 kHz, with a 24% duty cycle, which equates to a Capacitor Voltage (green)=849V peak, 525 Vrm.

Figure 3A:
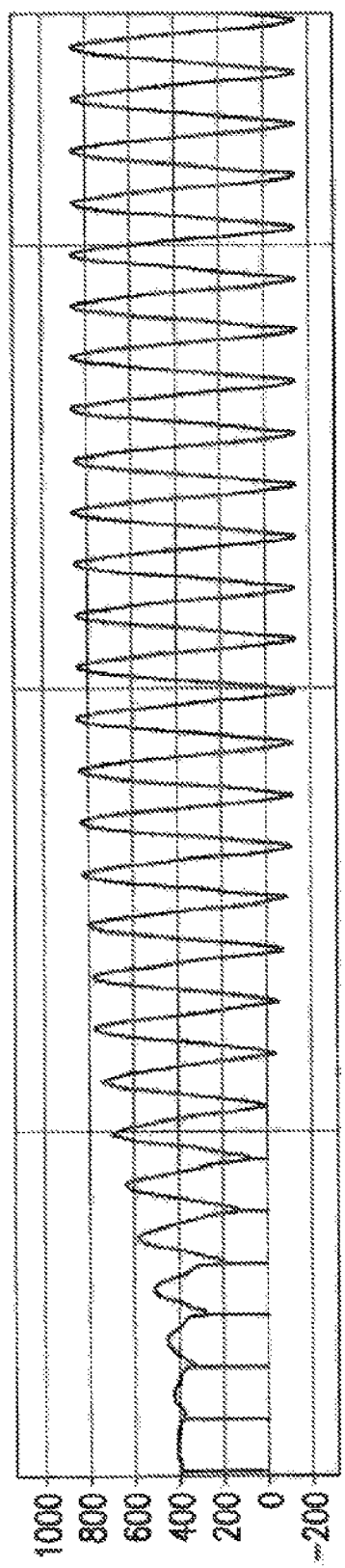
FIG. 3A illustrates embodiments of the disclosure.
Figure 3B:
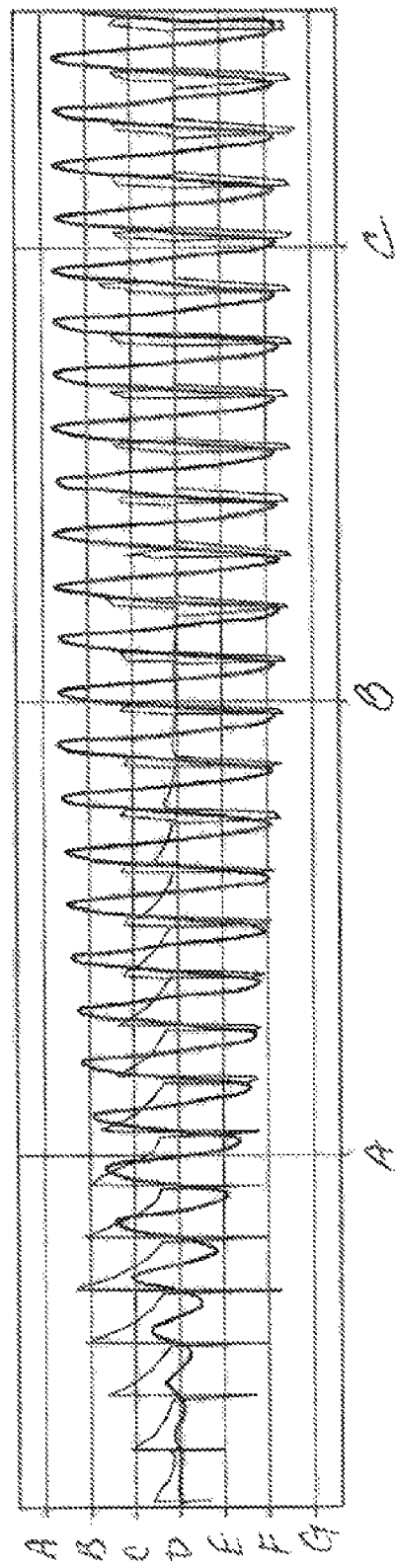
FIG. 3B illustrates embodiments of the disclosure.

FIGS. 3A and 3B are graphical illustrations of the embodiments. More particularly, FIG. 3A illustrates the voltages VC1, Vbattery terminal, and Vce for K1; and FIG. 3B illustrates the currents IC1, IL2, IL3, and IR2. The time gradient for FIG. 3 is 2 ms.

In the illustrations, it should be noted that capacitor voltage (blue of FIG. 3A) startup is very well controlled, and higher currents flow in the recirculation circuit (pink of FIG. 3B) during start up and zero during steady state. The recirculation damping resistor (R2) is 100 mohm in this illustration, and consumes 1 Joule during start up. In this illustration, start up ramps the Switch Control Signal duty cycle from 0% to 24% over 1 ms.

In the foregoing detailed description, it may be that various features are grouped together in individual embodiments, and are otherwise described for the purpose of brevity in the disclosure. This method of disclosure is not to be interpreted as reflecting an intention that any embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A self-heating battery circuit, comprising:
   a high voltage battery having terminals, and a parasitic internal resistance (R1) and a parasitic terminal inductance (L1);
   a resonant circuit connected across the battery terminals suitable to generate high alternating currents about its resonant frequency (fr);
   an energy superposition unit connected across a capacitance of the resonant circuit, and including a switch (K1), wherein K1 is switched on and off at the resonant frequency, fr, and at a first duty cycle pursuant to a switch control signal, thereby generating a high alternating current through the high voltage battery.

2. The self-heating battery circuit of claim 1, further comprising a freewheeling circuit including at least a dampening device (R2) and a switch (K2), and which is capable of recirculating residual current when K1 turns off.

3. The self-heating battery circuit of claim 1, wherein fr is determined by $1/(2\pi*\text{sqrt}((L1+L2)*C1))$, where L2 and C1 are an added inductance of the resonant circuit, and C1 is the capacitance of the resonant circuit, respectively.

4. The self-heating battery circuit of claim 3, wherein L2 is zero if L1 exceeds a predetermined threshold.

5. The self-heating battery circuit of claim 1, wherein the energy superposition unit further comprises an induction (L3).

6. The self-heating battery circuit of claim 1, wherein the high alternating current is additionally generated through the resonant circuit.

7. The self-heating battery circuit of claim 2, wherein the freewheeling circuit enables a soft start up of the energy superposition unit.

8. The self-heating battery circuit of claim 7, wherein the freewheeling circuit is off during steady state operation of the energy superposition unit.

9. The self-heating battery circuit of claim 2, wherein the freewheeling circuit is remedial to a premature deactivation of K1.

10. The self-heating battery circuit of claim 1, wherein the high alternating current is substantially independent of R1.

11. The self-heating battery circuit of claim 1, wherein a magnitude of the high alternating current may be increased increasing a frequency of the switch control signal.

* * * * *